Aug. 15, 1950     W. B. WOODRING     2,519,054
FLAT PRIMARY BATTERY
Filed May 28, 1947
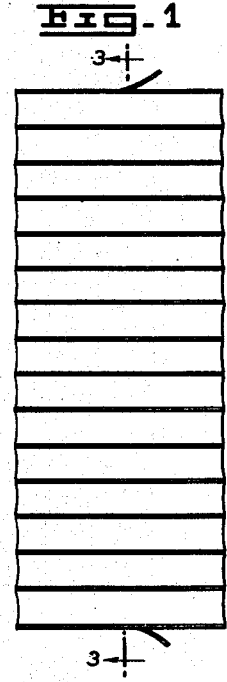
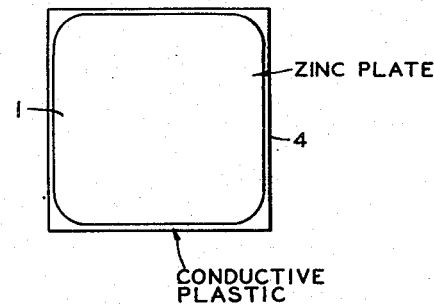
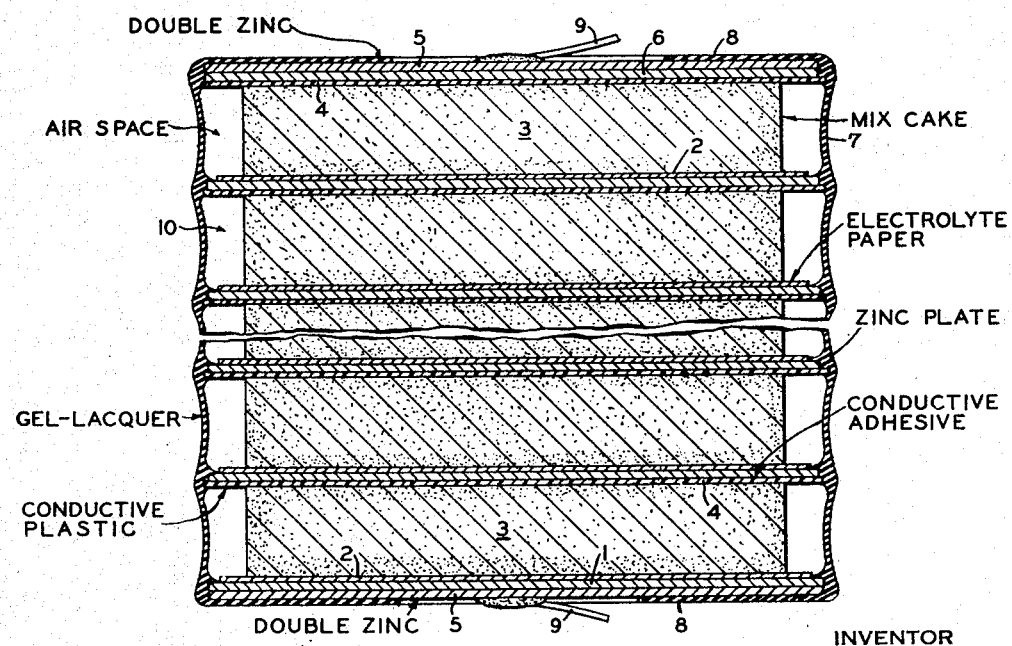
INVENTOR
WILLIAM B. WOODRING
BY
ATTORNEYS

UNITED STATES PATENT OFFICE 2,519,054

FLAT PRIMARY BATTERY

William B. Woodring, Hamden, Conn., assignor to Olin Industries, Inc., New Haven, Conn., a corporation of Delaware Application May 28, 1947, Serial No. 750,955

5 Claims. (Cl. 136—111)

This invention relates to primary batteries and more particularly to batteries of the "flat type" consisting of a number of cells formed of flat elements.

In the earlier types of flat batteries, the flat elements were arranged in proper order to produce a battery of the desired number of cells and then wrapped with tapes or the like, while under compression, to keep the elements in initimate contact with each other. Instead of wrapping the assembly with tapes, it was sometimes placed in a container and suitable wedges arranged in the space between the ends of the battery and the inside walls of the container to place them under compression. In either instance, the battery after being placed in the container, and while under compression, was surrounded by a suitable plastic material which was poured into the container, while in liquid or semi-liquid form, to fill the voids and then solidify, to retain the electrolyte in place.

Another type of flat battery consists of separate groups of flat elements, which may or may not form complete cells, but in which the peripheral margin of certain groups of elements, are covered with an integument to insulate the electrolyte in the respective cells, and the entire battery held in compression by binding tapes or the walls of the container in which it is confined. In these constructions the groups of elements are incapable of maintaining the desired pressure for purposes of electric contact without additional means, such as the aforesaid tapes or container wall.

It has also been proposed to construct a battery in which groups of flat elements are arranged in tray-like containers having open tops and partially open bottoms to permit contact between the adjacent elements. The depth of these trays is greater than that of the group of elements contained therein so that the side walls of the trays overlap when a number of them are nested to form a battery. In the constructions heretofore proposed, the side walls of the trays have either been tapered or stepped to permit nesting of the containers when assembled to form a battery.

In the copending application of Carl J. Krachenfels, Serial No. 750,962, filed May 28, 1947, there is disclosed and claimed a flat battery consisting of substantially flat cell elements arranged in proper order to form a plurality of cells with partitions consisting of sheets of plastic material, separating the cells from each other and with a jacket of plastic material surrounding the battery, the jacket being formed by immersing the battery in a solution of a gel lacquer at a temperature at which the lacquer is liquid and then permitting the battery, after removal, to stand at room temperature to cause gelling of the jacket.

In another application of Otto K. Reinhardt, Serial No. 751,041, filed May 28, 1947, there is disclosed and claimed a battery in which the partition member between the cells or groups of elements is formed of a continuous strip of a non-conductive plastic sheet material having openings so spaced that when the sheet is folded to arrange portions of it between adjacent groups of cell elements, the openings are positioned to permit the anode of one cell and the cathode of the adjacent cell to be conductively sealed or cemented to each other.

The invention herein disclosed comprises an improvement over that disclosed and claimed in the Krachenfels application. Instead of providing a plastic partition and a separate cathode member on one side of the separator, I incorporate a conductive carbon, such as graphite or acetylene black, in the plastic from which the sheet is formed and seal the anode of the adjacent cell to this sheet by a conductive, heat sensitive cement. The sheet thus serves as a cathode and the gel lacquer coating adheres to its edges to prevent intercell migration of the electrolyte.

In the accompanying drawing I have shown one embodiment of the invention. In this showing:

Fig. 1 is an elevation of the battery;

Fig. 2 is a plan view of a conductive plastic strip and a zinc plate cemented to each other; and Fig. 3 is a vertical, sectional view of the battery taken on line 3—3 of Fig. 1, on an enlarged scale.

Referring to Fig. 3 of the drawing, the battery consists of a plurality of cells, each of which includes a substantially flat zinc anode 1, an electrolyte saturated absorbent paper 2, a mix cake 3 of depolarizing material, and a combined cathode member and partition 4. As shown in Fig. 2 of the drawing, the member 4 is of slightly greater area than the zinc anode exposing an edge portion of the platsic conductive member 4 for sealing of the plastic coating whereby intercell migration of the electrolyte is prevented.

The separator 2 is any absorbent paper commonly used in battery constructions provided with a coating of paste on the side adjacent the anode and carries the usual electrolyte. The mix cake 3 consists of a pressed cake of the usual depolarizing mix employed in dry cells. It may thus consist of a mixture of powdered carbon and manganese dioxide with a suitable binder to retain the components in cake form.

The combined cathode and partition 4 consists of a sheet of cellulose acetate butyrate containing graphite or acetylene black. Such conductive sheets can readily be made by incorporating the desired proportion of acetylene black in a solution of cellulose acetate butyrate, evenly coating the required thickness of this solution on a suitable support, evaporating the solvent, and removing the resulting sheet from the support. A suitable solution may consist of a gel lacquer containing 1 part of carbon per 2 to 4 parts of the plastic. In constructing a battery, the zinc anodes 1 are secured to the sheets 4 by a conductive cement. This cement may consist of a mixture of a conductive pigment, such as graphite or acetylene black, or a mixture of the two, dispersed in any suitable solvent, such as a mixture of a ketone or an ester or mixture thereof, containing a thermoplastic cement admixed therewith. The cement may be any of the electrically conductive rubber compositions formed of natural rubber or synthetic elastomers. After the electrodes have been cemented to each other, they are assembled with the paper liners 2 and the mix cakes 3 to produce a battery of the desired number of cells. An outer zinc plate 5 may be placed on both the top and bottom of the battery to give it strength and rigidity and at the top where the adjacent electrode consists of a strip 4, an inner zinc plate 6 may also be provided.

The battery is then placed in a clamp which will maintain the assembled elements under compression and dipped in a gel lacquer. It is dipped in the lacquer with the axis of the battery perpendicular to the cell elements arranged horizontally. While partially submerged in the lacquer, the battery is rotated and a jacket consisting of side walls 7 and top and bottom portions 8 is formed on the battery. The rotation is continued after the coated stack is removed from the solution until the lacquer gels. This produces a uniform coating extending over the sides and a portion of the top and bottom leaving the central portion of the top free of the coating for the reception of the leads 9. The leads may be soldered or otherwise secured to the zinc plates 6.

The gel lacquer consists of plasticized cellulose acetate butyrate dissolved in a mixture of an aromatic hydrocarbon and an aliphatic alcohol of 3 to 5 carbon atoms. I have successfully employed a 20 percent solution of cellulose acetate butyrate molding powder, medium hard grade, dissolved in a mixture of 16 percent isopropanol and 84 percent xylene. The lacquer solution in which the cells are dipped is maintained sufficiently fluid by keeping it at a temperature from 115 to 120° C. The lacquer, however, gels at room temperature and when the battery is removed from the solution and brought to room temperature, the lacquer gels sufficiently firm that it does not flow. Upon evaporation of the solvent a casing or jacket 7—8 of a thickness of about .010" to .015" is formed. As the lacquer also shrinks upon gelling and drying, the jacket forms a shrink fit and maintains the battery under compression, thus assuring continued good electrical characteristics.

A further advantage is the fact that while a gel lacquer readily wets the plastic partitions 4 and therefore prevents intercell leakage of the electrolyte, it does not wet the depolarizing mixture. Thus on drying, an air space 10 is provided surrounding the mix cake of each cell.

The advantages of such construction over flat batteries fabricated from preformed cell containers will be obvious to those skilled in the art. On test a battery of this construction has shown greater capacity than other constructions of the same size. In the drawing I have shown a battery of the simplest type of construction for the purpose of illustration. It is apparent that modifications in the details of construction may be resorted to without departing from the spirit of the invention.

I claim:

1. A flat battery comprising a plurality of cells, each cell including substantially flat cell elements comprising an anode, an absorbent separator, a mix cake and a flat sheet of plastic having conductive carbon therein, said sheet serving as a cathode and a partition, and having its edges extending beyond the edges of the mix cake, and a taut jacket formed of a single layer of gel lacquer surrounding the battery and retaining the cell elements under compression, said jacket being bonded to the edges of the plastic sheets and spaced from the edges of the mix cakes to seal each cell from the others and provide an air space surrounding each mix cake.

2. A flat battery comprising a plurality of cells, each cell including substantially flat cell elements comprising an anode, an absorbent separator, a mix cake and a flat sheet of cellulose acetate butyrate having conductive carbon therein, said sheet serving as a cathode and a partition and having its edges extending beyond the edges of the mix cake, and a taut jacket formed of a single layer of gel lacquer surrounding the battery and retaining the cell elements under compression, said jacket being bonded to the edges of the plastic sheets and spaced from the edges of the mix cakes to seal each cell from the others and provide an air space surrounding each mix cake.

3. A flat battery comprising a plurality of cells, each cell including substantially flat cell elements comprising an anode, an absorbent separator, a mix cake and a flat sheet of plastic having conductive carbon therein, said sheet serving as a cathode and a partition and having its edges extending beyond the edges of the mix cake, the anode being of slightly smaller area than the combined cathode and partition and being cemented thereto by a conductive cement, and a taut jacket formed of a single layer of gel lacquer surrounding the battery and retaining the cell elements under compression, said jacket being bonded to the edges of the plastic sheets and spaced from the edges of the mix cakes to seal each cell from the others and provide an air space surrounding each mix cake.

4. A flat battery comprising a plurality of cells, each cell including substantially flat cell elements comprising an anode, an absorbent separator, a mix cake and a flat sheet of plastic having conductive carbon therein, said sheet serving as a cathode and a partition and having its edges extending beyond the edges of the mix cake, and a taut jacket formed of a single layer of cellulose acetate butyrate surrounding the battery and retaining the cell elements under compression, said jacket being bonded to the edges of the plastic sheets and spaced from the edges of the mix cakes to seal each cell from the others and provide an air space surrounding each mix cake.

5. A flat battery comprising a plurality of cells, each cell including substantially flat cell elements comprising an anode, an absorbent separator, a mix cake and a flat sheet of cellulose acetate butyrate having conductive carbon therein, said sheet serving as a cathode and a partition and having its edges extending beyond the edges of the mix cake, and a taut jacket formed of a single layer of cellulose acetate butyrate surrounding the battery and retaining the cell elements under compression, said jacket being bonded to the edges of the plastic sheets and spaced from the edges of the mix cakes, to seal each cell from the others and provide an air space surrounding each mix cake.

WILLIAM B. WOODRING.

REFERENCES CITED

The following references are of record in the file of this patent:

UNITED STATES PATENTS

| Number | Name | Date |
|---|---|---|
| 1,821,008 | Dittrick et al. | Sept. 1, 1931 |
| 1,916,709 | Zimmerman | July 4, 1933 |
| 2,154,312 | MacCallum | Apr. 11, 1939 |
| 2,416,576 | Franz et al. | Feb. 25, 1947 |

FOREIGN PATENTS

| Number | Country | Date |
|---|---|---|
| 269,977 | Great Britain | Apr. 27, 1927 |

OTHER REFERENCES

Simonds et al., Handbook of Plastics (1943), page 409.

Hamer et al., Trans. Electrochemical Society, volume 90 (1946), pages 449, 465.